US012149650B2

(12) United States Patent
Coverstone et al.

(10) Patent No.: US 12,149,650 B2
(45) Date of Patent: Nov. 19, 2024

(54) MODULAR ELECTRONICS BOX ENABLING DEVICE INTERCHANGEABILITY

(71) Applicant: STAR CO Scientific Technologies Advanced Research Co, LLC, Longview, TX (US)

(72) Inventors: Thomas E. Coverstone, Longview, TX (US); Jason Montgomery, Longview, TX (US)

(73) Assignee: STAR CO Scientific Technologies Advanced Research Co, LLC, Longview, TX (US)

( * ) Notice: Subject to any disclaimer, the term of this patent is extended or adjusted under 35 U.S.C. 154(b) by 0 days.

(21) Appl. No.: 18/504,229

(22) Filed: Nov. 8, 2023

(65) Prior Publication Data
US 2024/0214482 A1     Jun. 27, 2024

Related U.S. Application Data

(63) Continuation of application No. 17/479,836, filed on Sep. 20, 2021, now abandoned.

(51) Int. Cl.
*H04M 1/04*     (2006.01)
*H04M 1/02*     (2006.01)

(52) U.S. Cl.
CPC ........... *H04M 1/04* (2013.01); *H04M 1/0254* (2013.01)

(58) Field of Classification Search
CPC ...................................................... H04M 1/04
See application file for complete search history.

(56) References Cited

U.S. PATENT DOCUMENTS

| | | | |
|---|---|---|---|
| 6,184,654 B1 | 2/2001 | Bachner, III et al. | |
| 10,594,849 B2 | 3/2020 | Coverstone | |
| 2014/0006277 A1 | 1/2014 | Rao | |
| 2015/0305462 A1 | 10/2015 | Rothbaum | |
| 2017/0150792 A1* | 6/2017 | Kim | A45C 13/002 |
| 2020/0295796 A1 | 9/2020 | Jang | |

FOREIGN PATENT DOCUMENTS

| | | |
|---|---|---|
| CN | 212486172 | 2/2021 |
| CN | 112622320 | 4/2021 |
| KR | 101188978 | 10/2012 |

OTHER PUBLICATIONS

Int'l Search Report and Written Opinion ApplN No. PCT/US2022/043994 mailed Feb. 28, 2023.
Int'l Preliminary Report on Patentability ApplN No. PCT/US2022/043994 mailed Apr. 4, 2024.
Mophie, Juice Pack Connect Removable and Portable Wireless Charger containing a 5,000mAh internal battery https://www.zagg.com/en_us/juicepackconnect?cpn=12519211822&gclid=EAlalQobChMIIs36tqSY8gIVESitBh1L7QUEAQYBCABEgJbPvD_BwE&kw=&mkwid=_dc&pcrid=505295298125&pkw=&pmt= Accessed Aug. 5, 2021.
Mophie, Juice Pack Slim, Protective Battery Case with wireless charging, https://www.zagg.com/en_us/juice-pack-samsunggalaxy-s10 Accessed Aug. 5, 2021.

* cited by examiner

*Primary Examiner* — Hsinchun Liao
(74) *Attorney, Agent, or Firm* — McAndrews, Held & Malloy, Ltd.

(57) ABSTRACT

The mobile phone case is modular in design to provide for a portable smart auxiliary system. The portable smart auxiliary system can be used with mobile phones of various shapes or sizes. To enable the portability and universality of the auxiliary system, the mobile phone case includes at least one interchangeable elastomeric frame that is phone-specific.

20 Claims, 6 Drawing Sheets

MODULAR ELECTRONICS BOX ENABLING DEVICE INTERCHANGEABILITY

The present application is a continuation of U.S. application Ser. No. 17/479,836, filed Oct. 11, 2021. The aforementioned documents is hereby incorporated herein by reference in its entirety.

BACKGROUND

Limitations and disadvantages of conventional mobile phone cases will become apparent to one of skill in the art, through comparison with aspects of the present system set forth in the remainder of this disclosure with reference to the drawings.

INCORPORATION BY REFERENCE

U.S. patent application Ser. No. 17/026,574 titled "Mobile Device Cover for Use with a Host Mobile Device" is hereby incorporated herein by reference in its entirety.

BRIEF SUMMARY

Systems are provided for a mobile phone case, substantially as illustrated by and/or described in connection with at least one of the figures, as set forth more completely in the claims.

DETAILED DESCRIPTION

The case disclosed herein can be used with any-sized phone without having to make several new molds. One obstacle phone case manufacturers have is when a new phone model comes out, even if the phone changes by a few millimeters here or there, the old phone case and molds for same are not usable and the old phone case model cannot be sold for use with the new phone models. The production of new molds for each new phone model is a large capital expenditure for any phone case manufacturer. The case disclosed herein provides a universal electronics box that fits into a frame so that when a new phone model comes out, even with small dimensional changes, only one mold will change and the rest of the case, for the user, and molds, for the manufacturer, can stay the same.

The electronics box may be or may include a battery, a battery and display, a display, a cell booster, speaker, stereo speakers, another cell phone, auxiliary control switch, led grid, cameras, fingerprint scanners, grips, kickstands, colors, back designs, game controllers, LED lights or a display that change according to music, sound, or ambient sound, additional ports, belt loop holders, walkie talkies, projectors, solar charging arrays, or any other feature or combination of features with just the frame being changed. This allows a case manufacturer to sell a phone case that can be used for the lifetime of the user with only paying for minor upgrades of the frame when they upgrade their phone and if the new phone has different dimensions. This also allows a case manufacturer to sell a phone case that can be used for the lifetime of the user with only minor replacements of the electronics over time, if needed, such as a battery replacement. The present invention can provide literally a phone case for life. The electronics box may also comprise a processor and other components of a smart phone, thereby enabling a second phone in the case, so when the user places their phone into the case, two phones and two phone numbers are provided in one package.

As disclosed herein, an electronics box provides mobile power and device interchangeability. Consumers can buy a phone case for life because the electronics box can go with them as they upgrade their phone. A consumer can buy the electronics box and an elastomeric frame for their phone model. When they upgrade their phone model and if the size of the phone is different, they simply buy a new frame that fits that new phone model. An analysis of the major smartphones (e.g., Samsung, Apple, Pixel, Huawei, etc.) may determine the size of the electronics box.

Figure 1A:
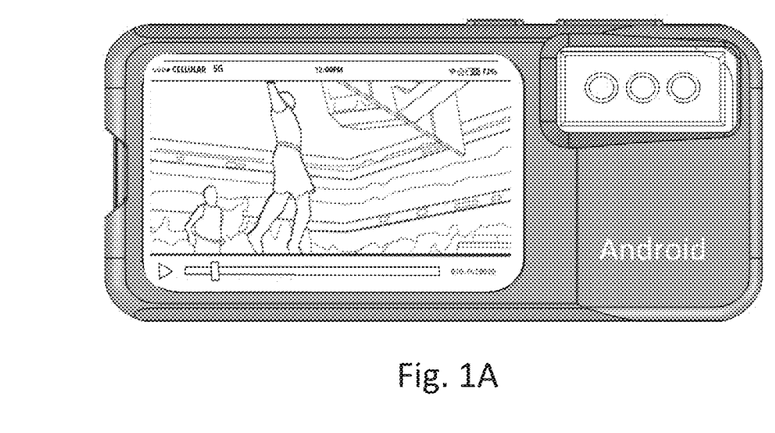
FIG. 1A is a view of an example electronics box incorporated into an example first phone case in accordance with various example implementations of this disclosure.
Figure 1B:
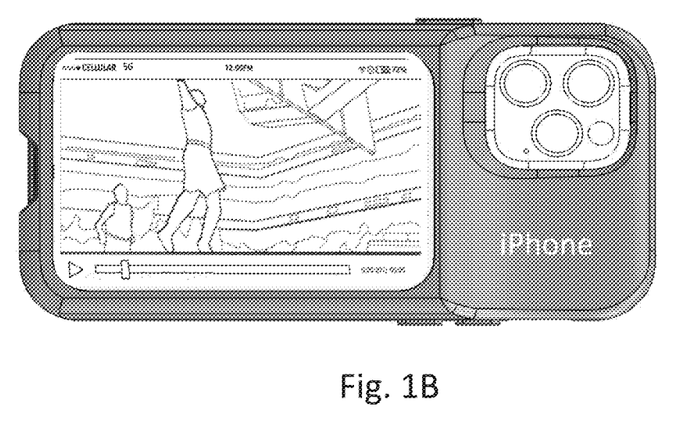
FIG. 1B is a view of the example electronics box incorporated into an example second phone case in accordance with various example implementations of this disclosure.
Figure 1C:
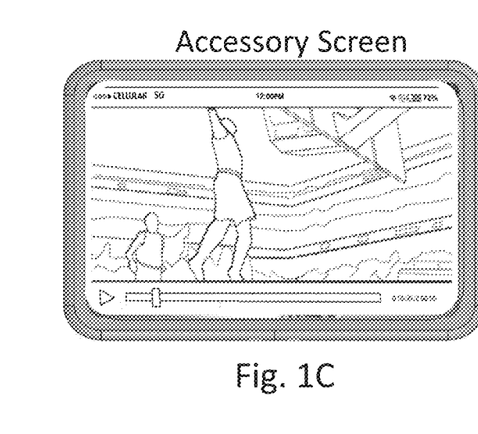
FIG. 1C is a view of the example electronics box being used as an example accessory screen in accordance with various example implementations of this disclosure.

FIG. 1A is a view of an example electronics box incorporated into an example first phone case for an Android phone. FIG. 1B is a view of the same example electronics box incorporated into an example second phone case for an iPhone. FIG. 1C is a view of the same example electronics box being used as an example accessory screen.

The video display illustrated in FIGS. 1A-1C may be turned on or off. An always-on mode may also be configured. For example, the video display may show a clock and/or a favorite logo or rotate through or constantly show a group of lightshows, icons, scrolling text, live broadcast or recorded video. For example, the video display may show sports, news, weather, TV shows, movies, entertainment, lightshows, music, videos, photos, and photo albums on the video display. The content displayed could also be from a broadcast, a mobile application, a website or user-created content.

During the always-on mode, the LED output level may be lowered to save battery power. The always-on mode may be interrupted, for example, when a notification, call, message, or the like is received. Following the interruption, the video display may go back to a dynamic state with user-selected material.

Figure 2:
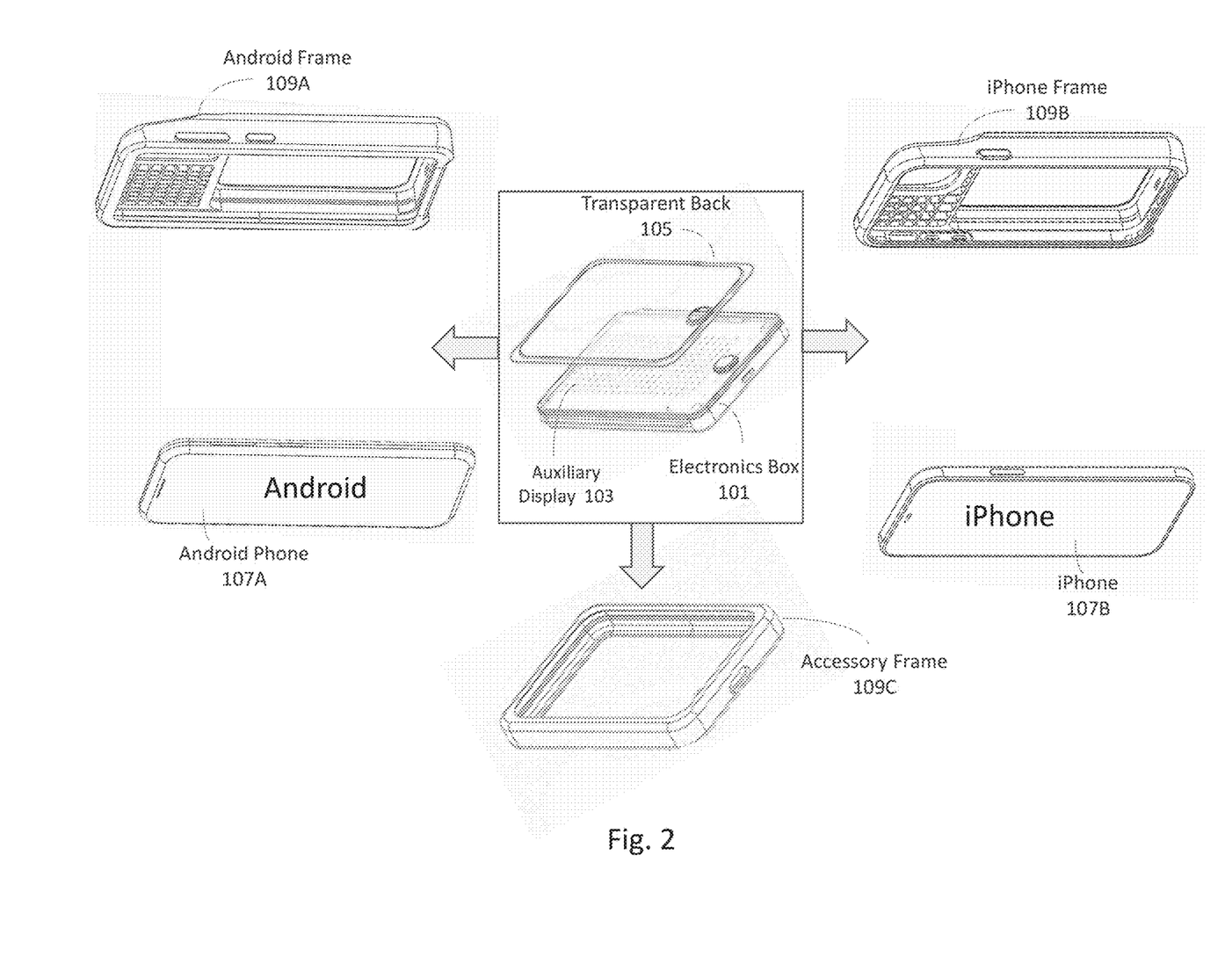
FIG. 2 is a perspective exploded view of how the example electronics box is incorporated into the views of FIG. 1A, FIG. 1B and FIG. 1C in accordance with various example implementations of this disclosure.

FIG. 2 is a perspective exploded view of how the example electronics box 101 is incorporated into the views of FIG. 1A, FIG. 1B and FIG. 1C. Electronics are sealed in the electronics box 101 making the electronics box waterproof. The electronics inside the electronics box may be conformal coated so that the electronics inside the electronics box are waterproof or water resistant as well. The electronics box 101 may provide a second screen 103 and may also be used as a battery pack.

The case may have an interchangeable back. An interchangeable back 105 allows users to swap in any color or decorated back at will. The interchangeable back 105 may be flat or curved. A hardcoat may be applied to the back 105 as plastic, such as polycarbonate, may scratch. A hard coating prevents or minimizes scratches. The back may also be decorated in any way, such as for example, by using hydrographics, in-mold decoration, painting, silk screening, stained pieces similar to stained glass windows, or the like. Interchangeability allows the consumer to change color or customize the interchangeable back with graphics, such as any logo, picture, or design they choose, on the back 105 or use a default back 105 without requiring a new case. The back 105 may act as a screen protector for the electronics box 101 as back 105 will break or scratch before the electronics box 101. A customized graphic may be printed for the customer as well, such as by the customer sending or uploading a picture, logo, or graphic to the manufacturer or seller for printing, for example.

The electronics box 101 can be removed and used as a power pack for any wireless enabled charging device (e.g., Android phone 107A or iPhone 107B) or any device that can connect via a cable to the power pack. Any device that accepts wireless charging or a wired charge can connect to the box. There is a separate frame 109C that may be used just for the electronics box when the electronics box is being used independent from the frame, such as when the box is used as a power pack, for example. The electronics box 101 can provide power to a device via the wireless charger or the USB-C port. The electronics box 101 can receive power via the USB-C port, by way of example.

An elastomeric frame, 109A and 109b, for example, are the only new parts needed for a different or new phone model. Consumers can also purchase multiple color or designed frames 109A and 109B for a specific phone model. The frame can also be designed to have any pattern molded into the frame, or the frame may be decorated, such as tie dye, swirl, camo, stamped steel look, etc. Both the frame and the accessory frame may be designed to provide military drop protection, such as Mil. Spec. 810G-516.6, for the case, user's phone, or the electronics box.

Figure 3:
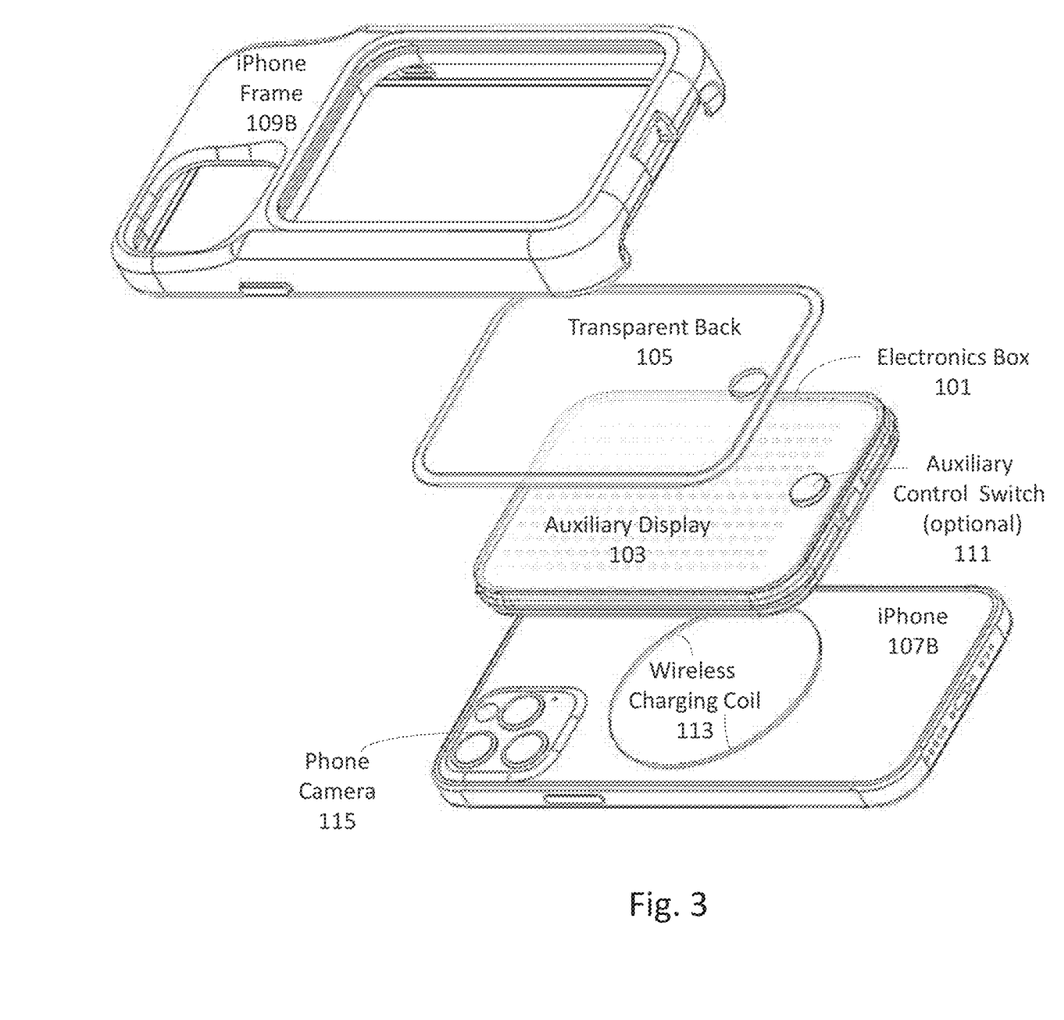
FIG. 3 is another perspective exploded view of the example phone case of FIG. 1B in accordance with various example implementations of this disclosure.

FIG. 3 is another perspective exploded view of the example phone case of FIG. 1B.

The mobile phone case (101, 105, 109B) is modular in design to provide for a variation in appearance while also providing a portable smart auxiliary system. The portable smart auxiliary system comprises an electronics box 101 that can be used with mobile phones 107B of various shapes or sizes. To enable the portability and universality of the electronics box 101, the mobile phone case includes an interchangeable elastomeric frame 109B that is phone-specific. The mobile phone case may also comprise an interchangeable back 105 that may be transparent, colored, or decorated or the like.

The electronics box 101 comprises electronic circuitry sealed in a case. The case may be waterproof, such as to the same level as the phone, such as IP 97. This is accomplished by providing waterproof components at any opening, such as the USB-C connector and providing a sealed button or a seal for the button at the auxiliary control switch. The electronic circuitry of the electronics box 101 may be controlled by a mobile app that is controlled by the mobile phone 107b. The electronic circuitry of the electronics box may also be independently controlled without the mobile phone 107b, for example, the box may be controlled by the switch.

The electronics box 101 may comprise an auxiliary control switch 111. The electronics box may also comprise an auxiliary display 103, speakers, a cell booster, components for another cell phone number, even with a different operating system as the phone, such as phone 107B. The electronics box may include, for example, phone components for an Android phone while the other phone is an iPhone, or vice versa. The auxiliary control switch 111 may be used to turn the auxiliary display 103 on and off, control Bluetooth settings, control the display, such as a flashlight mode, or different videos, such as a sporting event either live or recorded, a game that is hosted on the phone case, scrolling text from incoming messages or messages preset by the user for incoming text messages, emails, notifications from applications, or RSS feeds, etc. The auxiliary control switch 111 may also control a plurality of the functions of the app.

The auxiliary display 103 may comprises an LED grid (e.g., LED, OLED, LCD) and/or a touch-sensitive, graphical user interface, or a full display of any sort. A phone may also be housed in the case so that the case houses a second phone at one side of the case and a first phone in the frame at the other side of the case. One phone could be an iPhone and the opposing phone could be an Android phone, for example. Or for example, a display may be utilized for the auxiliary display 103.

The electronics box 101 may comprise a battery pack. This battery pack may be configured to wirelessly charge the mobile phone 107B or any other device that accepts wireless charging. Otherwise, a connection may be made with a connector between the auxiliary device 103 and the phone 107b, for example.

Further, for example, the mobile phone 107B may comprise a wireless charging coil 103 (inside the phone) for wireless charging. The battery pack of the electronics box 101 may be configured to be wirelessly rechargeable by including a matching wireless coil to communicate with or charge the phone. Alternatively, or in conjunction with wireless charging, the electronics box 101 may comprise a USB-C port, and the battery pack of the electronics box 101 may recharge via the USB-C port. Any other kind of connection (micro USB, Apple MFI connector, etc.) may also be incorporated into the electronics box 101 to charge the phone or the battery in the electronics box.

The electronics box 101 may comprise one or more magnets. The inclusion of magnets may enable the battery pack of the electronics box 101 to be used for any device utilizing magnets, such as iPhone mag safe, car dashboard holders, speakers, cell phone booster, a portable screen, etc.

The frame 109A-C specifically allows the electronics frame 101 to fit any mobile phone, iPad, tablet, laptop, etc. The frame 109A-C may be of any color or pattern. The frame 109A-C is preferably elastomeric to allow it to resume its original shape after being stretched around the phone 107A-B and to provide shock absorption. The frame 109A-C may comprise one or more magnets. The inclusion of magnets in the frame 109A-C may enable the mobile phone case to be used for any device utilizing magnets, iPhone mag safe, car dashboard holders, etc. The accessory frame 109C is used when the electronics box is removed from frame 109B, for example, and provides drop protection when the electronics unit is used separately from the phone.

The back 105 may be a transparent glass, Gorilla Glass, Plexiglas, polycarbonate or plastic cover over the display 103 of the electronics box 101. The components may be made from any compatible material, such as carbon graphite, metal, stainless steel, etc. The back 105 may be interchangeable and may be made of any color, tint or design, including sports teams, initials, or even to be printed with custom photographs of the user's desire. A user may upload the image or picture to a website for printing onto the back utilizing hydrographics, in mold decorations, silk screening, or any other method of customizing the back for the consumer may be utilized. The designs may be manufactured for a single user or may be manufactured in bulk. The back 105 may comprise hydrographics or the like to give any appearance, such as carbon graphite, stamped metal, camouflage, flowers, or any other design. The back 105 may also comprise a mirror finish, or one or more Swarovski crystals may be embedded into the back or attached to the back. The mirror finish may comprise a two way mirror to allow a display of the electronics box to show through the back piece while preventing a user from seeing through the back piece.

A hard protective coating such as graphene or the like may also be applied, for example.

Figure 4:
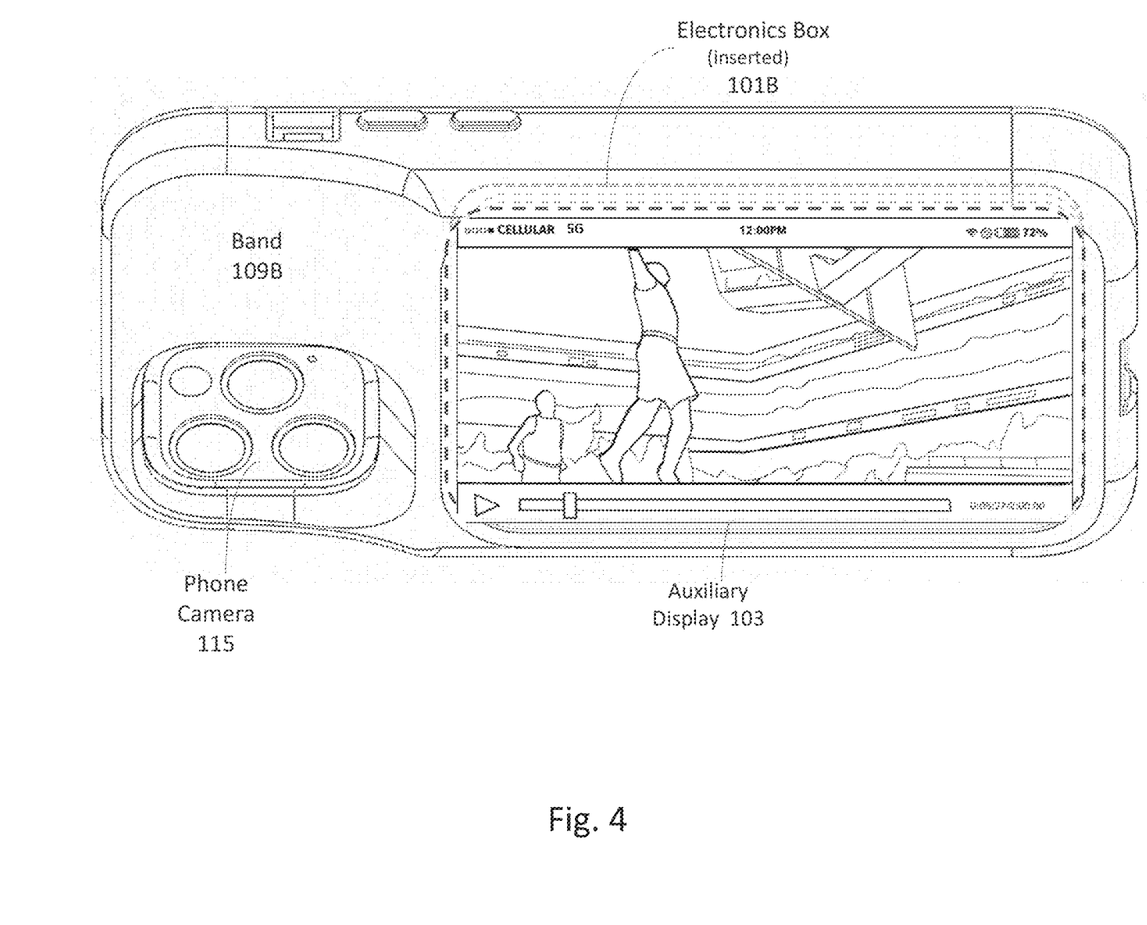
FIG. 4 is a perspective view of an assembled example phone case of FIG. 1B in accordance with various example implementations of this disclosure.

FIG. 4 is a perspective view of an assembled example mobile first phone case of FIG. 1B in accordance with various example implementations of this disclosure. FIG. 4 illustrates the location of the auxiliary display 103 and the electronics box 101B as removably inserted within the phone case. FIG. 4 also illustrates the opening in the frame 109B for a camera 115 angle requirements.

Figure 5:
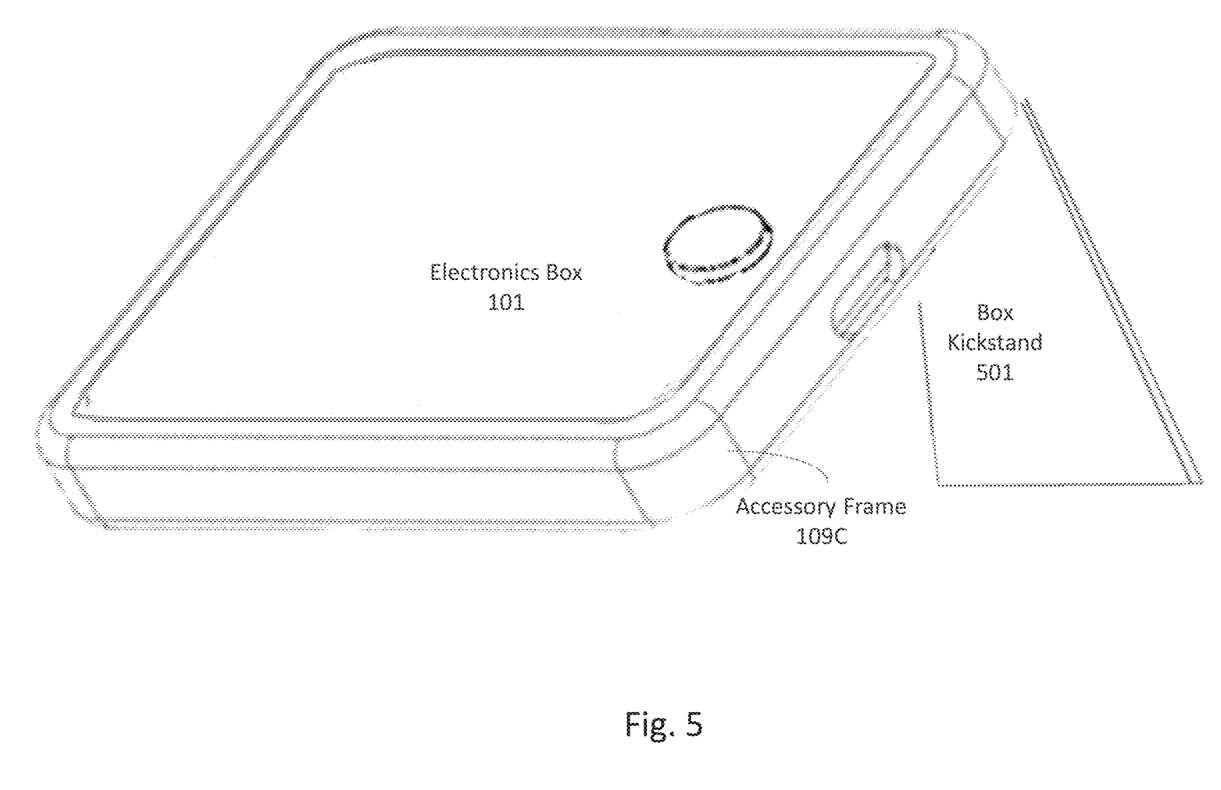
FIG. 5 is a perspective view of an example electronics box with frame that incorporates a kickstand in accordance with various example implementations of this disclosure.

FIG. 5 is a perspective view of an example electronics box with frame that incorporates a kickstand. The kickstand 501 is hingeably coupled to the back of the electronics box 101 to support viewing the electronics box 101 at variable angles and/or orientations. The kickstand 501 shown in FIG. 5 is exemplary only and may be located anywhere on the electronics box 101 and may take any shape or configuration. The kickstand 501 may also be an integral part of a frame that fits around the electronics box or any other mobile device. For example, the kickstand 501 may support a mobile device, phone or tablet in an orientation for viewing either a display on the mobile device or the electronics box. The kickstand may be U shaped or rectangular shaped, for example to conform to the fit requirements of the electronics box unit into the assembly.

Figure 6:
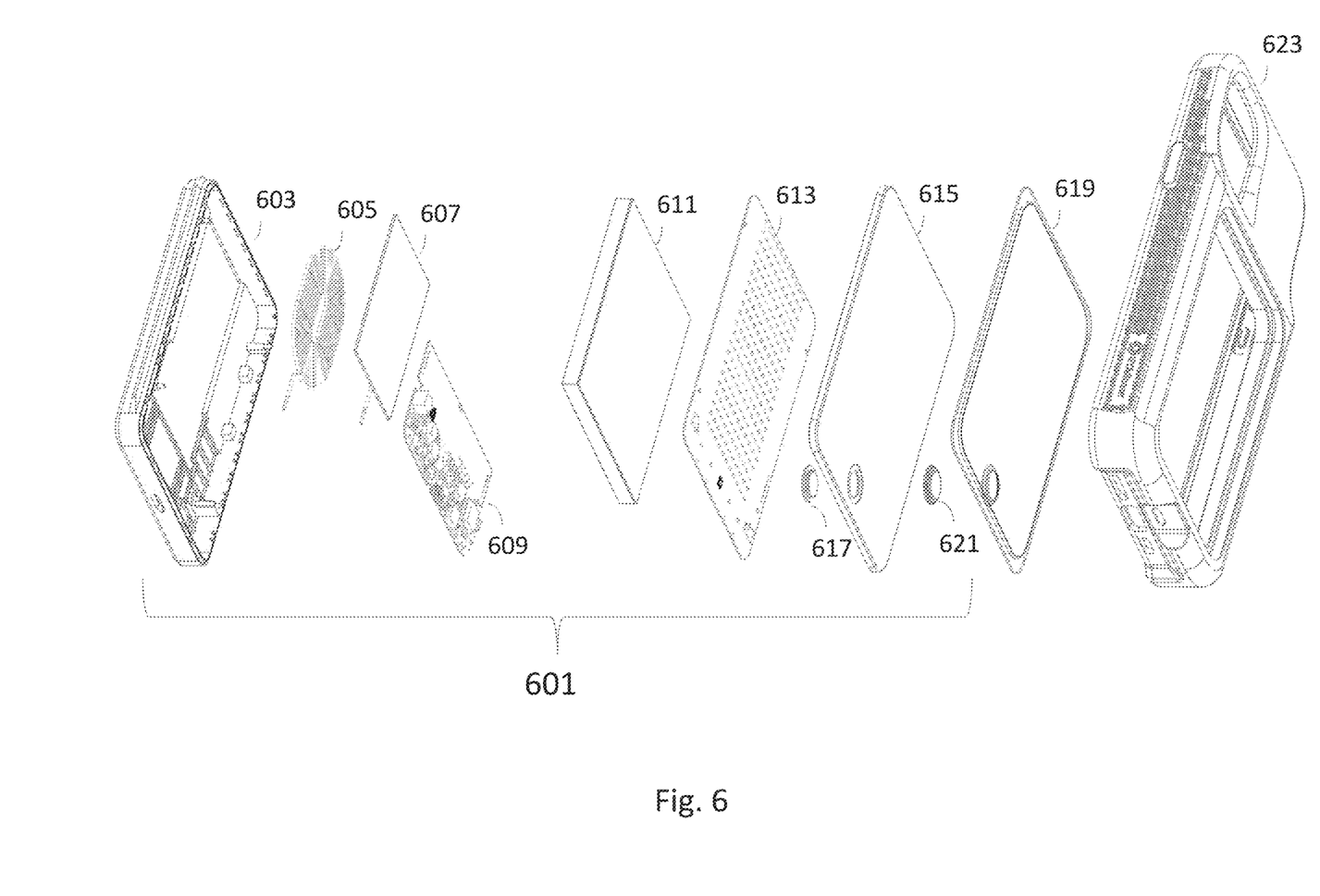
FIG. 6 is another perspective exploded view of the example electronics box and phone case in accordance with various example implementations of this disclosure.

FIG. 6 is another perspective exploded view of the example electronics box and phone case. In the illustrated example, the exploded view of the electronics box 601 comprises an enclosure bottom 603, a wireless charging coil 605, a charging coil backing 607, charging circuitry 609, a battery 611, an LED grid 613, an enclosure top 615, and a button 617. In the illustrated example, a seal 621 fits over the button 617 to provide a waterproof barrier. In the illustrated example, a back piece 619 fits between the electronics box 601 and an elastomeric frame 623.

Aspects of present electronics box may be realized in hardware, software, or a combination of hardware and software. Aspects of present electronics box may be realized in a centralized fashion in at least one computing system, or in a distributed fashion where different elements are spread across several interconnected computing systems. Any kind of computing system or other apparatus, adapted for carrying out the aspects of present electronics box described herein, is suitable. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present mobile phone case has been described with reference to certain implementations, it will be understood by those skilled in the art that various changes may be made and equivalents may be substituted without departing from the scope of the present mobile phone case. In addition, many modifications may be made to adapt a particular situation or material to the teachings of the present disclosure without departing from its scope. Therefore, it is intended that the present mobile phone case not be limited to the particular implementations disclosed, but that the present mobile phone case will include all implementations falling within the scope of the appended claims.

What is claimed is:

1. A system comprising:
   an electronics box;
   a first elastomeric frame configured to fit around the electronics box and a first phone model;
   a second elastomeric frame configured to fit around the electronics box and a second phone model of a different size compared to the first phone model; and
   a kickstand, operably coupled to the electronics box, configured to support the electronics box in an orientation for viewing a display.

2. The system of claim 1, wherein the system comprises a back piece that is configured to cover the electronics box.

3. The system of claim 1, wherein the electronics box comprises the display.

4. The system of claim 1, wherein the system comprises a two way mirror configured to allow the display to show through while preventing a user from seeing through.

5. The system of claim 1, wherein the electronics box comprises a battery pack configured to wirelessly charge a mobile phone.

6. The system of claim 1, wherein the electronics box comprises one or more magnets.

7. The system of claim 1, wherein the electronics box is controlled from a mobile phone.

8. The system of claim 1, wherein the electronics box comprises a processor configured to control the electronics box independently from a mobile phone.

9. The system of claim 1, wherein a battery in the electronics box is wirelessly rechargeable.

10. The system of claim 1, wherein a battery in the electronics box is operable to supply charge wirelessly.

11. A system comprising:
  an electronics box;
  a first elastomeric frame configured to fit around the electronics box and a first phone model;
  a second elastomeric frame configured to fit around the electronics box and a second phone model of a different size compared to the first phone model; and
  a two way mirror configured to allow a display to show through while preventing a user from seeing through.

12. The system of claim 11, wherein the system comprises a back piece that is configured to cover the electronics box.

13. The system of claim 11, wherein the electronics box comprises the display.

14. The system of claim 11, wherein the system comprises a kickstand, operably coupled to the electronics box, configured to support the electronics box in an orientation for viewing the display.

15. The system of claim 11, wherein the electronics box comprises a battery pack configured to wirelessly charge a mobile phone.

16. The system of claim 11, wherein the electronics box comprises one or more magnets.

17. The system of claim 11, wherein the electronics box is controlled from a mobile phone.

18. The system of claim 11, wherein the electronics box comprises a processor configured to control the electronics box independently from a mobile phone.

19. The system of claim 11, wherein a battery in the electronics box is wirelessly rechargeable.

20. The system of claim 11, wherein a battery in the electronics box is operable to supply charge wirelessly.

* * * * *